(12) United States Patent
Li et al.

(10) Patent No.: US 8,791,421 B2
(45) Date of Patent: Jul. 29, 2014

(54) BORON-CONTAINING GAS FILM FAST-NEUTRON DETECTOR

(71) Applicants: Nuctech Company Limited, Beijing (CN); Tsinghua University, Beijing (CN)

(72) Inventors: Yuanjing Li, Beijing (CN); Yigang Yang, Beijing (CN); Qinjian Zhang, Beijing (CN); Yi Liu, Beijing (CN); Yang Tai, Beijing (CN)

(73) Assignees: Nuctech Company Limited, Beijing (CN); Tsinghua University, Beijing (CN)

( * ) Notice: Subject to any disclaimer, the term of this patent is extended or adjusted under 35 U.S.C. 154(b) by 0 days.

(21) Appl. No.: 13/851,989

(22) Filed: Mar. 28, 2013

(65) Prior Publication Data
US 2013/0341519 A1 Dec. 26, 2013

(30) Foreign Application Priority Data

Jun. 21, 2012 (CN) .......................... 2012 1 0207062

(51) Int. Cl.
*G01T 3/06* (2006.01)
(52) U.S. Cl.
CPC ....................................... *G01T 3/06* (2013.01)
USPC ................................................... 250/390.01
(58) Field of Classification Search
CPC ..................................... G01T 3/06; G01T 3/00
USPC ........................................................ 250/368
See application file for complete search history.

(56) References Cited

U.S. PATENT DOCUMENTS

| 4,795,910 A * | 1/1989 | Henderson et al. ......... 250/483.1 |
| 6,989,541 B2 * | 1/2006 | Penn ......................... 250/390.01 |
| 2009/0236530 A1 * | 9/2009 | Bell et al. ....................... 250/362 |
| 2010/0111487 A1 * | 5/2010 | Aitken et al. .................. 385/141 |
| 2010/0155617 A1 * | 6/2010 | Stephan et al. ................ 250/382 |
| 2011/0278464 A1 * | 11/2011 | Clark et al. .................... 250/366 |
| 2013/0168560 A1 | 7/2013 | Yang |

* cited by examiner

*Primary Examiner* — Marcus Taningco
(74) *Attorney, Agent, or Firm* — Casimir Jones SC

(57) ABSTRACT

The present invention provides a boron-containing gas film fast-neutron detector. The fast-neutron detector comprises a package piece having a hollow cavity; a plastic scintillator array provided in the cavity and comprising a plurality of plastic scintillator units, a gap existing between adjacent plastic scintillator units; and a boron-containing gas filled into and gas-tightly sealed in the hollow cavity, the boron-containing gas forming a boron-containing gas film in the gap between the adjacent plastic scintillator units. The fast-neutron detector of the present invention completely does not require use of scarce and expensive $^{3}$He gas, nor needs a complicated boron film coating process, improves credibility of signal coincidence, and is adapted for measurement of environment background neutrons and extensively adapted for detection of radioactive substance at sites such as customs ports, harbors and the like.

10 Claims, 3 Drawing Sheets

BORON-CONTAINING GAS FILM FAST-NEUTRON DETECTOR

CROSS-REFERENCE TO RELATED APPLICATION

The present application claims priority to pending Chinese Patent Application No. CN201210207062.0, filed Jun. 21, 2012, the contents of which are incorporated by reference its entirety.

FIELD OF THE INVENTION

The present invention generally relates to application of nuclear technologies, and particularly to neutron scattering and security detection technology. More particularly, the present invention relates to a fast-neutron detector.

BACKGROUND OF THE INVENTION

For security detection technologies applied at sites such as customs ports, harbors and the like, radioactive substance detection technology is important one among them. Detection of the radioactive substance mainly involves detection of $\lambda$ rays and neutron rays. In traditional neutron ray-based detection technologies, it is a conventional scheme to use $^3$He proportional counters and polyethylene moderators for fast-neutron detection. However, due to problems such as worldwide insufficient supply of $^3$He and high prices, practicability of the $^3$He proportional counters in this scheme continuously falls, so people have been seeking for an alternative solution of $^3$He.

The reaction type for neutron detection is a nuclear reaction, and the participators of the nuclear reaction are neutrons and atomic nucleus. A high neutron absorbing section and emergent property of charged particles as required in a high detection efficiency cause the available types of nuclides (corresponding to atomic nucleus) very limited. Generally speaking, $^{10}$B, $^6$Li, $^{155,\ 157}$Gd are the only selectable nuclides, and $^{10}$B is a preferred nuclide therein. At present, a cooperation group has been established internationally to focus on study of $^{10}$B-based neutron detectors.

In the Chinese patent application No. 201110446162.4 filed by Applicant on Dec. 28, 2011, there is provided a fast-neutron detector based on $^{10}$B as neutron reaction nuclides. The preferred embodiment of this patent application uses plastic scintillators wrapped by a boron-coated aluminum foil to achieve neutron detection, which basic principle is as follows: fast-neutrons recoil in the plastic scintillators and deliver energy to recoiled protons (or other atomic nucleus, e.g., $^{12}$C), and the protons produces ionizing light emission in the plastic scintillators to form a first signal; at the same time, the neutrons lose their energy and are moderated as thermal neutrons until they are absorbed by a boron layer adhered on the surface of the aluminum foil. $^{10}$B in the boron layer and thermal neutrons are subjected to the following reaction:

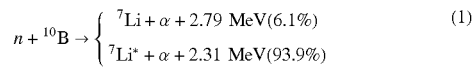

(1)

Products of this reaction are particles $^7$Li and $\alpha$, which both carry kinetic energy of several MeV and have opposite direction with respect to each other. One of $^7$Li and $\alpha$ penetrates the boron layer into the plastic scintillators to produce ionizing light emission, thereby forming a second signal. There is a time difference between the first signal and the second signal. The magnitude of the time difference is uncertain, but approximates an exponential distribution, and a typical average value is generally tens of microseconds, but specific average values depend on structural parameters (size of the plastic scintillators and thickness of the coated boron) of the detector.

The technical solution provided in the above-mentioned Chinese patent application has its own unique advantages, but this technology requires to plate boron on a substrate material such as aluminum foil to form a boron-containing coating film, and the output rate per unit time of this process is relatively low. Besides, on account of existence of the substrate material such as aluminum foil, only one of the two opposite charged particles $\alpha$ and $^7$Li produced in the reaction formula (1) can enter the plastic scintillator unit, which causes the resultant signal amplitude reduced, and does not facilitate improvement of the amplitude of the "second signal", nor facilitates improvement of coincidence property.

SUMMARY OF THE INVENTION

An object of the present invention is to provide a novel technical solution for fast-neutron detection without using the nuclide $^3$He in short supply, so as to reduce manufacturing costs and better meet increasing needs of security check apparatus for fast-neutron detectors.

A further object of the present invention is to simplify manufacturing process of the fast-neutron detector to improve the production efficiency.

Another further object of the present invention is to improve amplitude of signals formed during detection of the fast-neutron detector and more advantageously improve the coincidence property of the fast-neutron detector.

Generally speaking, the present invention inventively employs the following basic ideas to achieve the above objects of the present invention: forming a novel fast-neutron detector by using plastic scintillators as a neutron moderating and signal-forming medium, and using a boron-containing gas film formed by a boron-containing gas between adjacent plastic scintillators as a neutron absorbing medium. For the purpose of convenience, the novel type of fast-neutron detector is called herein as "boron-containing gas film fast-neutron detector".

In particular, the present invention provides a fast-neutron detector comprising: a package piece having a hollow cavity; a plastic scintillator array provided in the cavity and comprising a plurality of plastic scintillator units, a gap existing between adjacent plastic scintillator units; and a boron-containing gas filled into and gas-tightly sealed in the hollow cavity, the boron-containing gas forming a boron-containing gas film in the gap between the adjacent plastic scintillator units.

Preferably, the boron-containing gas is $BF_3$ gas or $BBr_3$ gas.

Preferably, the boron-containing gas film has a range of thickness which is determined by the following formula: $0.1 \text{ atm·mm} \le P \times d \le 9 \text{ atm·mm}$, wherein P is a gas pressure of the filled boron-containing gas, and d is a thickness of the boron-containing gas film.

Preferably, the thickness of the boron-containing gas film is about 0.8 mm-1.2 mm when the gas pressure of the boron-containing gas is one standard atmospheric pressure.

Preferably, each of the plastic scintillator units has a height of about 10 cm-50 cm and a length and width of about 0.5 cm-2 cm.

Preferably, each of the plastic scintillator units is a rectangular solid having a square cross section.

Preferably, each of the plastic scintillator units has a height of about 10 cm-50 cm, and a length and width of about 0.8 cm-1.2 cm.

Preferably, the package piece is made of aluminum or stainless steel.

Preferably, the plastic scintillator array, in its height direction, has a first end for receiving incident fast-neutrons and a second end opposite to the first end; and the fast-neutron detector further comprises: a light guide device disposed adjacent to the second end of the plastic scintillator array to collect and guide light formed in the plastic scintillator units and being emergent to the second end; and a photoelectrical converting device disposed at an emergent end of the light guide device to convert the light collected and guided by the light guide device thereon into electrical signals.

Preferably, the fast-neutron detector further comprises an amplifying shaping circuit configured to receive the electrical signal outputted from the photoelectrical converting device and amplify and shape it; a signal picking circuit configured to receive the electrical signal output by the amplifying shaping circuit and extract a time signal therefrom; a delay circuit configured to receive the time signal output by the signal picking circuit and delay it; a coincidence circuit at least having a first input channel and a second input channel, wherein the first input channel receives a non-delay time signal output by the signal picking circuit, the second input channel receives a delay time signal output by the delay circuit, and the coincidence circuit generates a coincidence pulse signal according to the non-delay time signal and the delay time signal; and a counter configured to receive the coincidence pulse signals output by the coincidence circuit and count them to obtain a coincidence count.

The boron-containing gas film fast-neutron detector according to the present invention completely does not require use of scarce and expensive $^3$He gas, and does not need a complicated boron film coating process, and enables ordinary plastic scintillator units to have a neutron sensitivity property only relying on the boron-containing gas film with a specific thickness.

Particularly, in the present invention the boron-containing gas forms a film between the plastic scintillator units on its own and does not require the use of any film-coating substrate material such as aluminum foil, so that the two charged particles $\alpha$ and $^7$Li generated in the reaction formula (1) can both form an ionization signal in the plastic scintillators so as to improve credibility of coincidence of the above-mentioned "first signal" and "second signal" to make the detection results more accurate.

The boron-containing gas film fast-neutron detector according to the present invention can be used for measurement of environment background neutrons, and extensively adapted for detection of radioactive substance at various sites such as customs ports, harbors and the like.

From the following detailed description of preferred embodiments of the present invention with reference to the drawings, those skilled in the art can better understand the above and other objects, advantages and features of the present invention.

BRIEF DESCRIPTION OF DRAWINGS

Preferred embodiments of the present invention will be described in detail hereafter with reference to the drawings by way of example, but not limitation. Like reference numbers throughout the drawings refer to the like or similar parts or portions. Those skilled in the art should appreciate that these drawings are not necessarily drawn to scale. In the drawings.

DETAILED DESCRIPTION OF PREFERRED EMBODIMENTS

Figure 1:
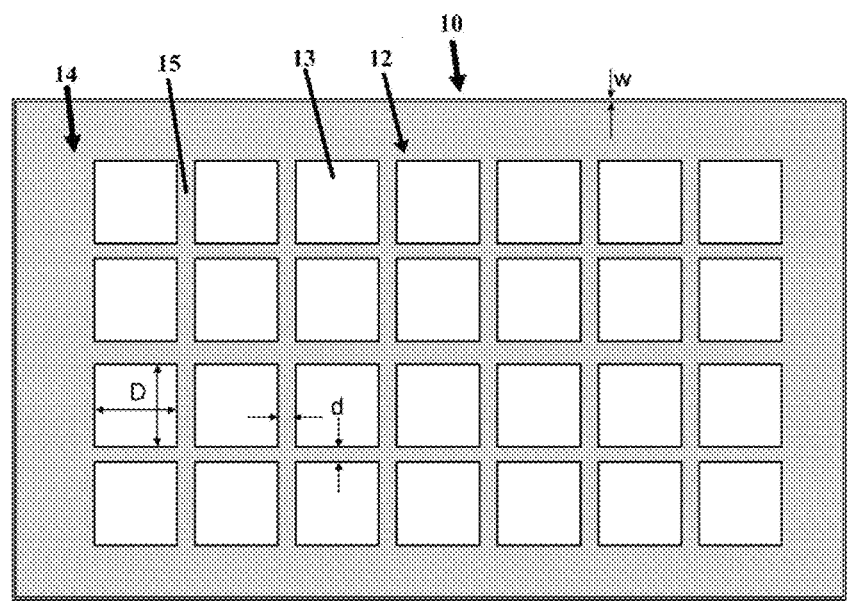
FIG. 1 is a schematic diagram of a boron-containing gas film fast-neutron detector according to a preferred embodiment of the present invention.

FIG. 1 is a schematic diagram of a boron-containing gas film fast-neutron detector according to a preferred embodiment of the present invention. As shown in the figure, the fast-neutron detector of the present invention mainly comprises a package piece 10, a plastic scintillator array 12 and a boron-containing gas 14.

Particularly, the package piece 10 has a hollow cavity for packaging the plastic scintillator array 12 and the boron-containing gas 14 to provide a gas-tight and light-tight closed operating environment for them, and maintain an accurate positional relation between the plastic scintillator units 13 of the plastic scintillator array 12. The package piece 10 may be made of any material which is adapted to provide a gas-tight and light-tight function and has an appropriate mechanical rigidity. For example, aluminum or stainless steel is a selectable material for manufacturing the package piece 10. Particularly, since a neutron absorbing section of aluminum is low, the package piece 10 is made of aluminum in a preferred embodiment of the present invention. Upon meeting the requirements for gas-tightness and mechanical rigidity, a wall thickness W of the package piece 10 is the thinner the better. With regard to a specific thickness of the package piece 10, those skilled in the art may set an appropriate thickness in practical applications according to the above teaching.

The plastic scintillator array 12 is disposed in the hollow cavity of the package piece 10. As shown in FIG. 1, the plastic scintillator array 12 is comprised of a plurality of plastic scintillator units 13, and a gap exists between adjacent plastic scintillator units 13. Preferably, these plastic scintillator units 13 are disposed in the package piece 10 at a same even spacing to form a m×n rectangular array, wherein m represents the number of rows of the array, n represents the number of columns of the array, and m and n are preferably an integer greater than or equal to 2. In some specific applications, m and n may be designed to be equal or unequal to each other as needed.

Figure 2:
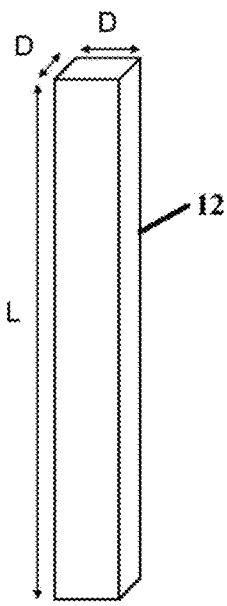
FIG. 2 is a schematic enlarged perspective view of a plastic scintillator unit in the plastic scintillator array shown in FIG. 1.

Furthermore, all the plastic scintillator units 13 are preferably produced as rectangular solids with the same dimensions. A cross section of the rectangular solid is preferably square, that is, the length and the width of the rectangular solid are equal, as shown in FIG. 2. In practical applications, the width D and the height L of the rectangular solid both are adjustable parameters. Those skilled in the art may adjust them according to a desired detector efficiency, wherein the width D of the rectangular solid may generally be about 0.5 cm-2 cm, preferably about 1 cm, and the height L of the rectangular solid may generally be 10 cm-50 cm.

The boron-containing gas 14 may be filled into and gas-tightly sealed in the hollow cavity. Since gaps communicating with each other exist between the individual plastic scintillator units 13, the boron-containing gas filled into the hollow cavity fills these gaps to form a boron-containing gas film 15. The thickness d of the boron-containing gas film 15 is defined by a spacing between the opposite sides of the adjacent plastic scintillator units 13.

It is needed to emphasize that, a key point of the present invention is of cleverly using the filling property of gas to automatically form a film between the accurately positioned plastic scintillator units 13. Particularly, the gas for forming the film according to the present invention is selected from $BF_3$, $BBr_3$ or other suitable boron-containing gases. As $BF_3$ gas is relatively stable, it is used as a preferred gas in an embodiment of the present invention. However, $BF_3$ is a hypertoxic gas and requires particular attention in application, and gas-tightness of the package piece 10 of the detector must be ensured. Of course, gas-tightness arrangement per se of the package piece is well known by those skilled in the art and will not be described in detail here.

Furthermore, an important issue to be considered is a thickness of the boron-containing gas film 15. The inventors of the present application recognize that the thickness of the boron-containing gas film 15 is jointly decided by the neutron absorbing efficiency and the emission distance of α particle and $^7Li$ in the gas, and it cannot be too small or too large. If the thickness of the boron-containing gas film 15 is too small, the neutron absorbing efficiency is too low and the above-mentioned "second signal" is too little to serve as the neutron detector. If the thickness of the boron-containing gas film 15 is too large, a probability of the α particle and $^7Li$ penetrating the gas is too low and the above-mentioned "second signal" will reduce; in addition, a moderating efficiency of the neutrons will also reduce so that the neutrons already escape before being moderated as thermal neutrons. This might cause both "the first signal" and "second signal" to reduce.

Particularly, the inventors of the present application realize that the thickness range of the boron-containing gas film may be preferably determined by the following formula: $0.1 \text{ atm·mm} \leq P \times d \leq 9 \text{ atm·mm}$, wherein P is the gas pressure of the filled boron-containing gas, and d is the thickness of the boron-containing gas film. The present invention does not impose particular requirements for the gas pressure of the filled gas, i.e., it is possible that the gas pressure is greater than, equal to or less than one standard atmospheric pressure. Therefore, for example, if the gas pressure of the boron-containing gas is one standard atmospheric pressure, the thickness of the boron-containing gas film may be selected from a range of 0.1 mm-9 mm. Again for example, in a preferred embodiment of the present invention, the gas pressure of the boron-containing gas is one standard atmospheric pressure, the thickness d of the boron-containing gas film is preferably about 0.8 mm-1.2 mm, most preferably about 1 mm.

Figure 3:
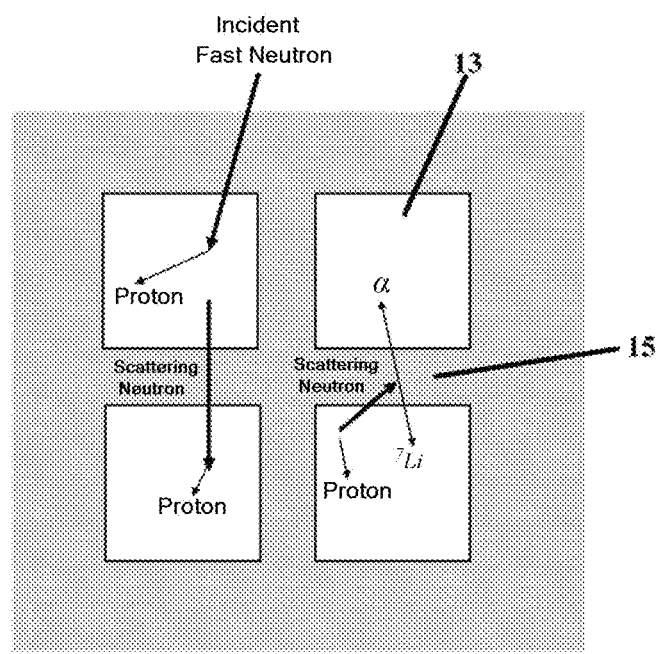
FIG. 3 illustratively shows a detection procedure of the fast-neutrons by a simplified detector structure.

FIG. 3 illustratively shows a detection procedure of the fast-neutrons by using a simplified detector structure. As shown in the figure, when an incident fast-neutron is incident into the detector, it reacts with a plastic scintillator unit 13 to produce a recoil proton and a scattering neutron; energy of the scattering neutron reduces, but the reaction can continue; in subsequent reaction, further recoil protons and further scattering neutrons are formed; and energy of the neutrons constantly reduces until they become final scattering neutrons. All recoil protons produced in this procedure cause ionizing light emission in the plastic scintillator units 13. Since the birth time-points of these protons are closely adjacent, the light-emitting events of these protons may be regarded as the same event for a subsequent photoelectrical converting device, and the signal produced by it is the above-mentioned "first signal". At the same time, the neutrons have energy low enough so that they become thermal neutrons, there is a relatively small probability for absorption between the thermal neutrons and H and C in the plastic scintillator units 15, but there is a very large reaction section between the thermal neutrons and $^{10}B$ in the boron-containing gas. When thermal neutrons pass through the boron-containing gas film 15 between the plastic scintillator units 13, they react with $^{10}B$ therein as shown in the formula (1) to produce two particles α and $^7Li$ which are emergent in opposite directions. Since the gas has a relatively low capability to block the charged particles, there is a very large probability (the specific probability is related to the position of neutron absorption) that the two charged particles penetrate the gas and respectively enter two adjacent plastic scintillator units 15. The two charged particles form ionizing light emission respectively in their respective plastic scintillator units 15. Since they emit light at the same time, the subsequent photoelectrical converting device can only regard them as one signal, namely, the above-mentioned "second signal". The n/λ suppression ratio of the detector may be improved by true coincidence between the "first signal" and "second signal".

So far, those skilled in the art can successfully achieve a fast-neutron detection by selecting any suitable light guide device and/or photoelectrical converting device currently known or to be known in the future in combination with the detector structure taught above, because these devices for collecting, guiding and processing the optical signals are well-known or easily implemented by those skilled in the art. Particularly, FIG. 4 and FIG. 5 illustrate a light guide device 20 and a photoelectrical converting device 30 preferably used for the detector structure according to the present invention to facilitate those skilled in the art to implement the present invention and gain further advantages.

Figure 4:
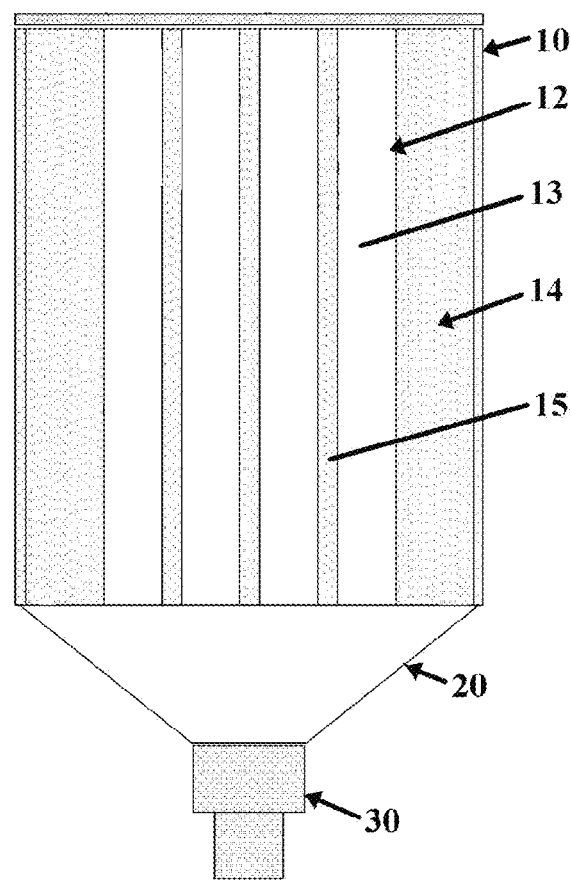
FIG. 4 is a schematic structural view of a fast-neutron detector according to a preferred embodiment of the present invention.
Figure 5:
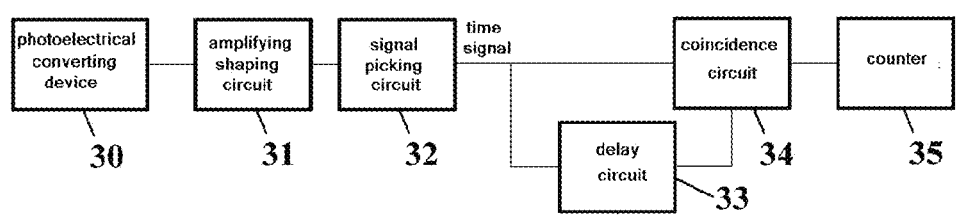
FIG. 5 is a schematic block diagram of a processing circuit for processing electrical signals outputted by a photoelectrical converting device and improving n/λ ratio based on a time coincidence method.

As shown in FIG. 4, incident fast-neutrons are received at a first end of the plastic scintillator array 12 in a height direction thereof, and the light guide device 20 is disposed adjacent to a second end opposite to the first end. The light guide device 20 collects and guides light formed in the individual plastic scintillator units 13 and being emergent to the second end of the plastic scintillator array 12. Furthermore, the photoelectrical converting device 30 is disposed at an emergent end of the light guide device 20 to convert the light collected and guided by the light guide device 20 thereon into electrical signals.

In the present invention, the photoelectrical converting device 30 is preferably a photoelectrical multiplier tube. However, in some embodiments, other photoelectrical converting devices such as optical diodes are also possible.

In addition, in other embodiments of the present invention, identical or similar light guide device and/or photoelectrical converting device may also provided at the first end of the plastic scintillator array 12 to collect and detect the light that might be emergent from the first end of the plastic scintillator array 12 to further improve the detection efficiency.

Still as shown in FIG. 4, when the light device 20 and the photoelectrical converting device 30 are provided only at the second end of the plastic scintillator array 12, a layer of reflection material (such as aluminum foil, or polytetrafluoroethylene) may be preferably added at the first end of the plastic scintillator array 12 to reflect photons so as to increase the number of photons collected by the light guide device 20 and the photoelectrical converting device 30 at the second end.

In order not to obscure the technical solution of the present application, some common circuits usually needed after the photoelectric converting device 30 (e.g., an analog/digital converting circuit that may be needed in the subsequent processing) will not be described in detail or will be omitted hereafter, because these ordinary processing circuits are well-known and readily implemented for those skilled in the art.

Since the detector of the present invention is implemented based on the plastic scintillators which are per se sensitive to the X/λ, the detector of the present invention cannot prevent from sensitivity to X/λ measurement, which is disadvantageous for improvement of the n/λ ratio. In order to eliminate the above disadvantageous effect and increase the n/λ ratio, in some further preferred embodiments of the present invention, a time coincidence method is particularly employed to select neutron events on the basis principle that each captured neutron necessarily experiences complete loss of incident kinetic energy (the main objects for the loss are recoil protons); after a period of time after production of the recoil protons, the neutrons will be captured and form charged particles; the time distribution of the two groups of charged particles is in a certain relationship, and the relationship may be extracted by a coincidence circuit so that the n/λ ratio may be increased.

FIG. 5 is a schematic block diagram of a processing circuit for processing electrical signals outputted by a photoelectrical converting device to increase the n/λ ratio based on a time coincidence method. As shown in this figure, the photoelectrical converting device 30 converts the light collected and guided thereon into an electrical signal, then an amplifying shaping circuit 31 receives the electrical signal outputted from the photoelectrical converting device 30 and amplifies and shapes it; a signal picking circuit 32 receives the electrical signal outputted by the amplifying shaping circuit 31 and extracts a time signal therefrom (for example, by means of threshold judgment and selection or other time extracting methods known in the art); a delay circuit 33 receives the time signal outputted by the signal picking circuit 32 and delays it; a coincidence circuit 34 receives a non-delay time signal outputted by the signal picking circuit 32 at its first input channel, receives the delay time signal outputted by the delay circuit 33 at its second input channel, and generates a coincidence pulse signal according to the non-delay time signal and the delay time signal; a counter 35 receives the coincidence pulse signals outputted by the coincidence circuit 34 and counts them to finally obtains a coincidence count.

Finally, those skilled in the art can appreciate that although exemplary preferred embodiments have been illustrated and described in detail, many other variations or modifications conforming to the principles of the present invention can be directly determined or derived from the disclosure of the present application without departing from the spirit and scope of the present invention. Therefore, the scope of the present invention shall be understood and recognized as covering all of these other variations or modifications.

What is claimed is:

1. A fast-neutron detector, comprising:
   a package piece having a hollow cavity;
   a plastic scintillator array provided in the cavity and comprising a plurality of plastic scintillator units, a gap existing between adjacent plastic scintillator units; and
   a boron-containing gas filled into and gas-tightly sealed in the hollow cavity, the boron-containing gas forming a boron-containing gas film in the gap between the adjacent plastic scintillator units.

2. The fast-neutron detector according to claim 1, wherein the boron-containing gas is $BF_3$ gas or $BBr_3$ gas.

3. The fast-neutron detector according to claim 1, wherein the boron-containing gas film has a range of thickness which is determined by the following formula: $0.1 \text{ atm·mm} \leq P \times d \leq 9 \text{ atm·mm}$, wherein P is a gas pressure of the filled boron-containing gas, and d is a thickness of the boron-containing gas film.

4. The fast-neutron detector according to claim 1, wherein the thickness of the boron-containing gas film is about 0.8 mm-1.2 mm when the gas pressure of the boron-containing gas is one standard atmospheric pressure.

5. The fast-neutron detector according to claim 1, wherein each of the plastic scintillator units has a height of about 10 cm-50 cm and a length and width of about 0.5 cm-2 cm.

6. The fast-neutron detector according to claim 1, wherein each of the plastic scintillator units is a rectangular solid having a square cross section.

7. The fast-neutron detector according to claim 6, wherein each of the plastic scintillator units has a height of about 10 cm-50 cm, and a length and width of about 0.8 cm-1.2 cm.

8. The fast-neutron detector according to claim 1, wherein the package piece is made of aluminum or stainless steel.

9. The fast-neutron detector according to claim 1, wherein the plastic scintillator array, in its height direction, has a first end for receiving incident fast-neutrons and a second end opposite to the first end; and the fast-neutron detector further comprises:
a light guide device disposed adjacent to the second end of the plastic scintillator array to collect and guide light formed in the plastic scintillator units and being emergent to the second end; and
a photoelectrical converting device disposed at an emergent end of the light guide device to convert the light collected and guided by the light guide device thereon into electrical signals.

10. The fast-neutron detector according to claim 9, further comprising:
an amplifying shaping circuit configured to receive the electrical signal outputted from the photoelectrical converting device and amplify and shape it;
a signal picking circuit configured to receive the electrical signal outputted by the amplifying shaping circuit and extract a time signal therefrom;
a delay circuit configured to receive the time signal outputted by the signal picking circuit and delay it;
a coincidence circuit at least having a first input channel and a second input channel, wherein the first input channel receives a non-delay time signal outputted by the signal picking circuit, the second input channel receives a delay time signal outputted by the delay circuit, and the coincidence circuit generates a coincidence pulse signal according to the non-delay time signal and the delay time signal; and
a counter configured to receive the coincidence pulse signals outputted by the coincidence circuit and count them to obtain a coincidence count.

* * * * *